(12) United States Patent
Gura et al.

(10) Patent No.: US 7,650,374 B1
(45) Date of Patent: Jan. 19, 2010

(54) HYBRID MULTI-PRECISION MULTIPLICATION

(75) Inventors: Nils Gura, Mountain View, CA (US); Lawrence A. Spracklen, Boulder Creek, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 786 days.

(21) Appl. No.: 10/996,103

(22) Filed: Nov. 23, 2004

Related U.S. Application Data

(60) Provisional application No. 60/549,238, filed on Mar. 2, 2004.

(51) Int. Cl.
*G06F 7/52* (2006.01)

(52) U.S. Cl. .................................. 708/620

(58) Field of Classification Search ............. 708/490, 708/523, 620–632, 200–209
See application file for complete search history.

(56) References Cited

U.S. PATENT DOCUMENTS

| | | | |
|---|---|---|---|
| 4,722,068 A * | 1/1988 | Kuroda et al. ............. | 708/625 |
| 4,754,421 A * | 6/1988 | Bosshart .................. | 708/625 |
| 4,863,247 A | 9/1989 | Lasher et al. | |
| 4,893,268 A * | 1/1990 | Denman et al. ........... | 708/627 |
| 5,121,431 A | 6/1992 | Wiener | |
| 5,347,481 A | 9/1994 | Lambert et al. | |
| 5,457,804 A * | 10/1995 | Ohtomo ................... | 708/627 |
| 6,049,815 A | 4/2000 | Lambert et al. | |
| 6,199,087 B1 | 3/2001 | Blake et al. | |
| 6,430,677 B2 * | 8/2002 | Pechanek et al. .......... | 708/496 |
| 6,633,896 B1 | 10/2003 | Moore et al. | |
| 6,675,286 B1 * | 1/2004 | Sun et al. ................. | 708/603 |
| 6,687,725 B1 | 2/2004 | Chen et al. | |
| 6,748,410 B1 | 6/2004 | Gressel et al. | |
| 6,763,365 B2 | 7/2004 | Chen et al. | |
| 7,072,929 B2 * | 7/2006 | Pechanek et al. .......... | 708/622 |
| 7,181,484 B2 | 2/2007 | Stribaek et al. | |
| 2002/0044649 A1 | 4/2002 | Gallant et al. | |
| 2002/0103843 A1 | 8/2002 | McGregor et al. | |
| 2002/0161813 A1 * | 10/2002 | Chiueh et al. ............ | 708/622 |
| 2003/0123654 A1 | 7/2003 | Lambert et al. | |
| 2003/0123655 A1 | 7/2003 | Lambert et al. | |
| 2004/0158597 A1 | 8/2004 | Ye et al. | |

OTHER PUBLICATIONS

Erdem, S.S. & Koc, C.K. "A Less Recursive Variant of Karatsuba-Ofman Algorithm for Multiplying Operands of Size a Power of Two," Proceedings of the 16th IEEE Symposium on Computer Arithmetic (ARITH-16'03), Jun. 15-18, 2003 pp. 28-35.

Bailey, Daniel V. & Paar, Christof, "Optimal Extension Fields for Fast Arithmetic in Public-Key Algorithms," Proceedings of the 18th Annual International Cryptology Conference on Advances in Cryptology, Lecture Notes in Computer Science, vol. 1462, Springer-Verlag, UK, 1998, pp. 472-485.

Cohen, Henri et al., "Efficient Elliptic Curve Exponentiation Using Mixed Coordinates," Proceedings of the International Conference on the Theory and Applications of Cryptology and Information Security: Advances in Cryptology, Lecture Notes In Computer Science, vol. 1514, Springer-Verlag, UK, 1998, pp. 51-65.

(Continued)

*Primary Examiner*—Chat C Do
(74) *Attorney, Agent, or Firm*—Robert C Kowert; Meyertons, Hood, Kivlin, Kowert & Goetzel, P.C.

(57) ABSTRACT

Multiple-precision hybrid multiplication is a technique that takes advantage of row-wise multiplication and column-wise multiplication. To generate a product for multiple-precision operands, partial products of the multiple-precision operands are accumulated in accordance with a hybrid of column-wise multiplication and row-wise multiplication. The partial products accumulated are of partial rows. The partiality of the row-wise partial products is defined by a parameter.

44 Claims, 7 Drawing Sheets

OTHER PUBLICATIONS

Gupta, Vipul et al., "Speeding up Secure Web Transactions Using Elliptic Curve Cryptography," Sun Microsystems, Inc., http://research.sun.com/projects/crypto/, 9 pages.

Hitchcock, Yvonne et al., "Implementing an Efficient elliptic curve cryptosystem over GF(p) on a smart card" ANZIAM J. 44(E), Austral. Mathematical Soc. 2003, pp. C354-C377.

Comba, P.G., "Exponentiation Cryptosystems on the IBM PC," IBM Systems Journal, vol. 29, No. 4, 1990, pp. 526-538.

Kaliski, Burt, "TWIRL and RSA Key Size," Technical Notes, May 1, 2003, RSA Laboratories, 5 pages, downloaded from Internet <http://www.rsasecurity.com/rsalabs/node.asp?id=2004> as of Sep. 13, 2006.

KOC, Cetin Kaya, "High Speed RSA-Implementation," RSA Laboratories, Nov. 1994, Version 2, 73 pages.

"Recommended Elliptic Curves for Federal Government Use" Jul. 1999, 43 pages, downloaded from Internet <http://csrc.nist.gov/CryptoToolkit/dss/ecdsa/NISTReCur.pdf#search='recommended%20elliptic%20curves%/20for%20federal%20government%20use> as of Sep. 13, 2006.

"Sec 2: Recommended Elliptic Curve Domain Parameters," Standards for Efficient Cryptography, Version 1, Certicom Research, Sep. 20, 2000, 51 pages.

Woodbury, Adam D., et al., "Elliptic Curve Cryptography on Smart Cards without Coprocessors," Worcester Polytechnic Institute, The Fourth Smart Card Research and Advanced Applications Conference, Sep. 20-22, 2000, Bristol, UK, 20 pages.

Gura, Nils et al., "Comparing Elliptic Curve Cryptographic and RSA on 8-bit CPUs," Cryptographic Hardware and Embedded Systems—CHES 2004: 6th International Workshop (Cambridge, Massachusetts, USA), Aug. 11-13, 2004, Lecture Notes in Computer Science, vol. 3156, Marc Joye, Jean-Jacques Quisquater (Eds.), Springer, ISBN 3-540-22666-4, pp. 119-132.

Karatsuba, A. and Y. Ofman, "Ymnozhenie mnogozhachnix chisel na avtomatax," Doklady Academii Nauk SSSR, v. 145, No. 2, pp. 293-294, 1962.

Hasegawa, T. et al., "A practical implementation of elliptic curve cryptosystems over GF(p) on a 16-bit microcomputer," Lecture Notes in Computer Science, v. 1431, pp. 182-194, 1998.

Hankerson, D., et al., Guide to Elliptic Curve Cryptography, pp. 48-53, 95-113, 129-147, 205-212, and 224-226, Springer-Verlag, 2004.

U.S. Appl. No. 10/387,007 entitled "Hardware Accelerator for Elliptic Curve Cryptography".

U.S. Appl. No. 10/387,008 entitled "Generic Modular Multiplier Using Partial Reduction".

U.S. Appl. No. 10/387,009 entitled "Modular Multiplier".

U.S. Appl. No. 10/387,104 entitled "Generic Implementaion of Elliptic Curve Cryptography Using Partial Reduction".

Cohn, Leonard Allen, "Generate-Propogate Adders," ChoPP Computer Corporation, prioir 2000, pp. 1-16.

Mano, M. Morris, "Computer System Architecture," Prentice-Hall, Inc., 1976, pp. 244-249.

Intel® Itanium™ Processor, "High Performance on Security Algorithms (RSA Decryption Kernel)," Intel Corporation 2001, pp. 1-8.

Intel$^{SM}$ Itanium™, "Architecture Software Developer's Manual, vol. 1, Application Architecture," Revision 2.1, Oct. 2002, 2 pages.

GroBschadl, Johann, "Instruction Set Extension for Long Integer Modulo Arithmetic on RISC-Based Smart Cards," Proceedings of the 14th Symposium on Computer Architecture and High Performance Computing 2002, 7 pages.

H. Pietilainen, "Elliptic Curve Cryptography on Smart Cards," Master's Theses, Helsinki University of Technology, Oct. 12, 2000, pp. i-81.

F. Morain, et al., "Speeding Up the Computations on an Elliptic Curve Using Addition-Subtraction Chains," Rapport de Recherche 983, INRIA, France, Mar. 1989, http://citeseer.ist.psu.edu/morain90speeding.html, pp. 119-130.

Guajardo, et al., "Efficient Algorithms for Elliptic Curve Cryptosystems," ECE Dept., Worcester Polytechnic Institute, pp. 1-16 (CRYPTO '97, Springer-Verlag, LNCS 1294, pp. 342-356, 1997).

Weimerskirch, et al., "Generalizations of the Karatsuba Algoirthm for Polynomial Multiplication," Communication Security Group, Dept. of Electrical Engineering & Information Sciences, Ruhr-Universitat, Germany, Mar. 2002, pp. 1-23.

Blake-Wilson, S., "Additional ECC Groups for IKE", IPSec Blake-Wilson, Dierks, Hawk-Working Group, Jul. 23, 2002, pp. 1-17.

Gupta, V., "ECC Cipher Suites for TLS," Blake-Wilson, Dierks, Hawk—TLS Working Group, Aug. 2002, pp. 1-31.

Standards for Efficient Cryptography, "SEC 2: Recommended Elliptic Curve Domain Parameters," Certicom Research, Sep. 20, 2000, pp. i-45.

"RFC 2246 on the TLS Protocol Version 1.0", http://www.ietf.org/mail-archive/ietf-announce/Current/msg02896.html, Mar. 26, 2003, 2 pages, including Dierks, T., "The TLS Protocol Version 1.0", Dierks & Allen, Jan. 1999, pp. 1-80.

Song, et al., "Low-Energy Digit-Serial/Parallel Finite Field Multipliers," Journal of VLSI Signal Processing 19, 1988, pp. 149-166.

Agnew, et al., "An Implementaion of Elliptic Curve Cryptosystems Over F2155," IEEE Journal on Selected Areas on Communications, vol. 11. No. 5, Jun. 1993, pp. 804-813.

Halbutogullari, et al., "Mastrovito Multiplier for General Irreducible Polynomials," IEEE Transactions on Computers, Vo. 49, No. 5, May 2000, pp. 503-518.

Yanik, et al., "Incomplete Reduction in Modular Arithmetic," IEEE Proc.-Comput. Digit. Tech., vol. 149, No. 2, Mar. 2002, pp. 46-52.

Blum, et al., "High-Radix Montgomery Modular Exponentiation on Reconfigurable Hardware," IEEE Transactions on Computers, vol. 50, No. 7, Jul. 2001, pp. 759-764.

Gao, et al., "A Compact Fast Variable Key Size Elliptic Curve Cryptosystem Coprocessor," Proceedings of the Seventh Annual IEEE Symposium on Field-Programmable Custom Computer Machines, 1998.

Ernst, et al., "Rapid Prototyping for Hardware Accelerated Elliptic Curve Public-Key Cryptosystems," 12th IEEE Workshop on Rapid System Prototyping, Monterey, CA Jun. 2001, pp. 24-29.

Orlando, et al., Aug. 2000, "A High-Performance Reconfigurable Elliptic Curve Processor for GF(2m)," CHES 2000 Workshop on Cryptographic Hardware and Embedded Systems, Springer-Verlag, Lecture Notes in Computer Science, 1965, pp. 41-56.

Lopez, et al., Aug. 1999, "Fast Multiplication on Elliptic Curves over GF(2m) without Precomputation," CHES 1999 Workshop on Cryptographic Hardware and Embedded Systems, Springer-Verlag, Lecture Notes in Computer Science, 1717, pp. 316-327.

Hankerson, et al., Aug. 2000, "Software Implementation of Elliptic Curve Cryptography over Binary Fields," CHES 2000 Workshop on Cryptographic Hardware and Embedded Systems, Springer-Verlag, Lecture Notes in Computer Science, 1965, pp. 1-24.

Koblitz, Neal, "Elliptic Curve Cryptosystems," Mathematics of Computation, Vo. 48, No. 177, Jan. 1987, pp. 203-209.

Schroeppel, et al., 1995, "Fast Key Exchange with Elliptic Curve Systems," Advances in Cryptography, Crypto '95, Springer-Verlag, Lecture Notes in Computer Science 963, pp. 43-56.

Woodbury, et al., Sep. 2000, "Elliptic Curve Cryptography on Smart Cards Without Coprocessors," The Fourth Smart Card Research and Advanced Applications (CARDIS2000) Conference, Bristol, UK, pp. 71-92.

Miller, V., "Use of Elliptic Curves of Cryptography," In Lecture Notes in Computer Science 218, Advances in Cryptology, CRYPTO '85, pp. 417-426, Springer-Verlag, Berling, 1986.

Itoh, et al., "A Fast Algorithm for Computer Multiplicative Inverses in GF(2m) Using Normal Bases," Informaiton and Computation, vol. 78, No. 3, 1988, pp. 171-177.

Bednara, et al., "Reconfigurable Implementation of Elliptic Curve Crypto Algorithms," Proceedings of the International Parallel and Distributed Processing Symposium, IEEE Computer Society, 2002, 8 pages.

U.S. Dept. of Commerce/National Institute of Standards and Technology, "Digital Signature Standard (DSS)," Federal Information Processing Standards Publication, Jan. 27, 2000, pp. 1-74.

Blake-Wilson, et al, "ECC Cipher Suites for TLS," Blake-Wilson, Dierks, Hawk—TLS Working Group, Mar. 15, 2001, pp. 1-22.

Goodman, et al., "An Energy-Efficient Reconfigurable Public-Key Cryptography Processor," IEEE Journal of Solid-State Circuits, vol. 36, No. 11, Nov. 2001, pp. 1808-1820.

Shantz, Sheueling Chang, "From Euclid's GCD to Montgomery Multiplication to the Great Divide," Sun Microsystems, Jun. 2001, pp. 1-10.

* cited by examiner

US 7,650,374 B1

HYBRID MULTI-PRECISION MULTIPLICATION

CROSS-REFERENCE TO RELATION APPLICATION(S)

This non-provisional patent application claims benefit under 35 U.S.C. §119(e) of U.S. Provisional Patent Application No. 60/549,238, entitled "COMPARING ELLIPTIC CURVE CRYPTOGRAPHY AND RSA ON SMALL DEVICES", filed on Mar. 2, 2004, and naming as inventors Nils Gura and Lawrence A. Spracklen.

BACKGROUND

The present invention relates to the field of computers. More specifically, the present invention relates to computer arithmetic. Modular multiplication and squaring of large integers are the single most performance-critical operations for the Rivest, Shamir, Adleman (RSA) algorithm and elliptic curve cryptography (ECC). Therefore, high-performance implementations focus specifically on optimizing this operation. Specifically, on many processors, multiple-precision multiplication of large integers not only involves arithmetic operations, but due to limited register space also has significant amount of data transport to and from memory. Assuming schoolbook-multiplication of m-bit integers on a device with a word size of k bits, m-bit integers have to be divided into n-word operands, where $$n = \lceil \frac{m}{k} \rceil.$$

To compute an m×m-bit multiplication, the number of k×k-bit multiplication operations is fixed to $n^2$ and possible reduction of the number of additions is limited. Therefore, computation time can mainly be optimized by reducing the number of non-arithmetic operations and specifically memory operations.

Conventional techniques for performing multiple-precision multiplication include row-wise multiplication and column-wise multiplication. When multiplying two multi-word integers $A=(a_{n-1}, \ldots, a_1, a_0)$ and $B=(b_{n-1}, \ldots, b_1, b_0)$, row-wise multiplication keeps the multiplier $b_i$ constant and multiplies it with the entire multiple-precision multiplicand $(a_{n-1}, \ldots, a_1, a_0)$ before moving to the next multiplier $b_i+1$. Partial products are summed up in an accumulator consisting of n registers $(r_{n-1}, \ldots r_1, r_0)$, each of bit width k. Upon completion of a row, the last register of the accumulator ($r_0$ for the first row) can be stored to memory as part of the final result and can be reused for accumulation of the next row. Two registers are required to store the constant $b_i$, and one variable $a_j$. In the described implementation, row-wise multiplication requires n+2 registers and performs $n^2+3n$ memory accesses. That is, for each k×k multiplication one memory load operation is needed. On processor architectures that do not have sufficient register space for the accumulator, up to $n^2+1$ additional load and $n^2-n$ additional store operations are required. On the other hand, processors that can hold both the accumulator and the entire multiplicand in register space can perform row-wise multiplication with 2n+1 registers and only 4n memory accesses. In addition to memory accesses, pointers to multiplicand, multiplier and result may have to be adjusted on implementations using indexed addressing. If multiplicand and multiplier are indexed, one pointer increment/decrement is needed for each load operation. FIG. 4 depicts an illustrative example of row-wise multiplication with a multiplicand 401 and a multiplier 402.

Column-wise multiplication sums up columns of partial products $a_j*b_i$, where i+j=v for column v. A description of column-wise multiplication can be found in *Exponentiation Cryptosystems on the IBM PC, IBM Systems Journal*, Vol. 29, Issue 4, pages 526-538 (1990) by P. G. Comba. FIG. 6 depicts an illustrative example of column-wise multiplication with a multiplicand 601 and a multiplier 602. At the end of each column, one k-bit word is stored as part of the final multiplication result. Column-wise multiplication requires $4+\lceil \log_2 (n)/k \rceil$ registers, thus can be implemented on a platform with limited register space. However, $2n^2+2n$ memory operations have to be performed, which correspond to approximately two memory load operations per k×k multiplicand $a_j$ and multiplier $b_i$ once for every k×k-bit multiplication.

SUMMARY OF THE INVENTION

It has been discovered that varying partial product accumulation allows for a multiplication technique scalable to different target platforms, and reduction of memory accesses. A hybrid of row-wise multiplication and column-wise multiplication can adapt to various target platform characteristics, such as available register space, size of multiple-precision operands, word size, etc. A tuning parameter can be defined and/or derived from the target platform characteristics. The target platform then performs hybrid multiple-precision multiplication in accordance with the defined tuning parameter.

These and other aspects of the described invention will be better described with reference to the Description of the Embodiment(s) and accompanying Figures.

BRIEF DESCRIPTION OF THE DRAWINGS

FIG. 2A depicts an exemplary flowchart for hybrid multiple-precision multiplication for ascending column partial products. FIG. 2B depicts an exemplary flowchart that continues from FIG. 2A for a descending column loop.

The use of the same reference symbols in different drawings indicates similar or identical items.

DESCRIPTION OF THE EMBODIMENT(S)

The description that follows includes exemplary systems, methods, techniques, instruction sequences and computer program products that embody techniques of the present invention. However, it is understood that the described invention may be practiced without these specific details. In other instances, well-known protocols, structures and techniques have not been shown in detail in order not to obscure the invention.

Multiple-precision hybrid multiplication accumulates partial products of partial rows (or partial columns depending on the perspective taken). Multiple-precision hybrid multiplication allows a technique that takes advantage of row-wise multiplication and column-wise multiplication. A technique that reaps the benefits of both column-wise multiplication and row-wise multiplication allows multiplication of multiple-precision operands to be tailored to various platforms. The technique can be tuned to adapt to a particular platform, thus allowing adaptive optimization of multiplication for different platforms. A multiple-precision hybrid multiplication technique can be tuned to operate anywhere on a continuum ranging from column-wise multiplication to row-wise multiplication. For a target platform with a limited amount of register space, multiple-precision hybrid multiplication code (e.g., fixed state machine, micro-code, etc.) can be tuned to accumulate partial products within the confines of the limited register space, resembling column-wise multiplication. For a target platform with a larger amount of register space, the multiple-precision hybrid multiplication code can be tuned to accumulate partial products with fewer memory operations by utilizing the greater amount of register space.

Tuning a multiple-precision hybrid multiplication technique includes defining a parameter that defines a row width for performing the hybrid multiplication. The row width defines the number of operand words to be utilized for a partial product accumulation within a column.

Furthermore, multiple-precision multiplication can be performed as part of modular multiplication, including Montgomery modular multiplication. For example, a technique for performing Montgomery modular multiplication, such as described in U.S. patent application Ser. No. 10/789,311, entitled "METHOD AND APPARATUS FOR IMPLEMENTING PROCESSOR INSTRUCTIONS FOR ACCELERATING PUBLIC-KEY CRYPTOGRAPHY", naming Sheueling Chang Shantz, Leonard Rarick, Lawrence Spracklen, Hans Eberle, and Nils Gura as inventors, filed on Feb. 27, 2004, which is incorporated herein by reference in its entirety, can implement the multiple-precision multiplication described herein.

Figure 1:
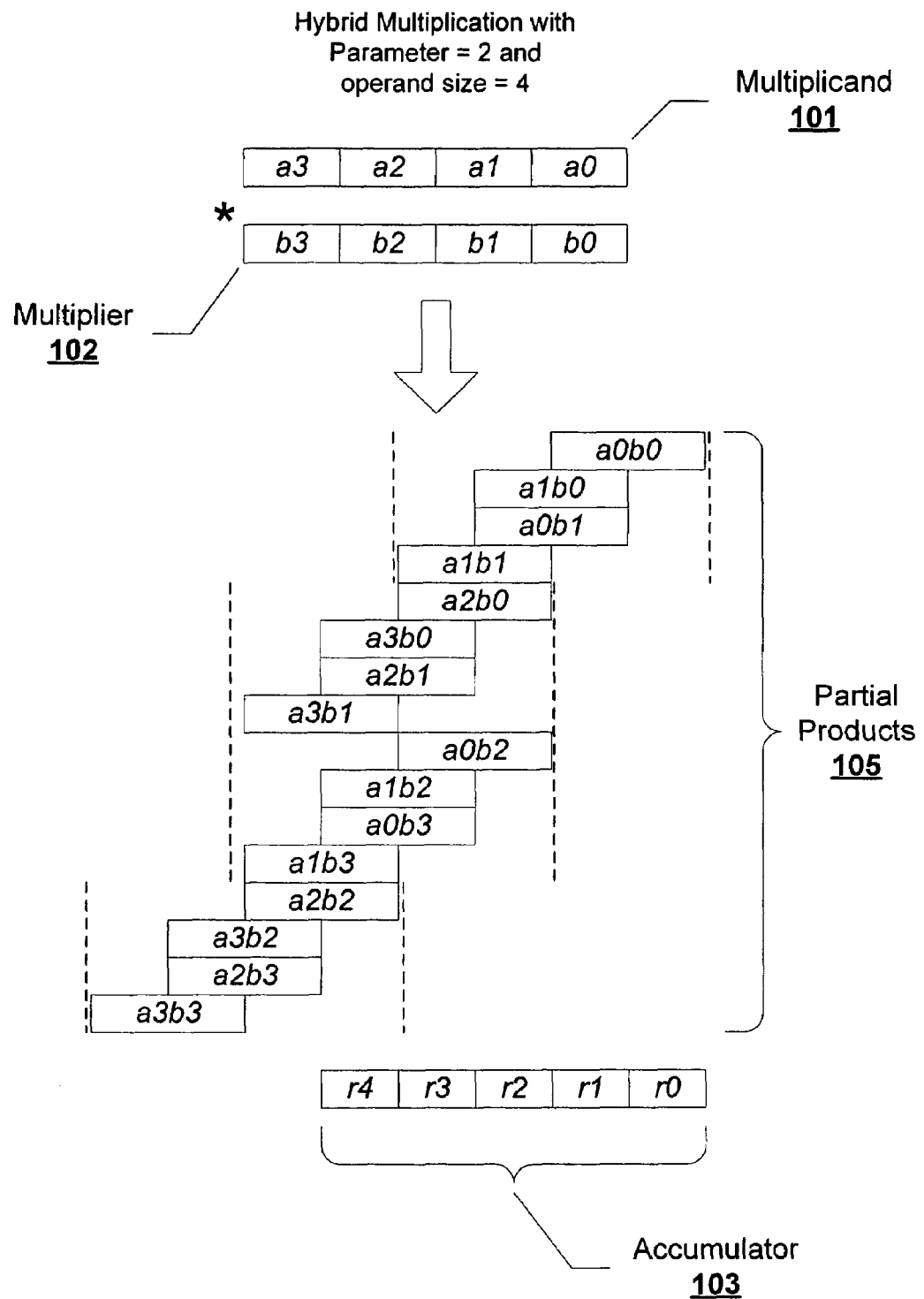
FIG. 1 depicts an exemplary hybrid multiplication of two multiple-precision operands.

FIG. 1 depicts an exemplary hybrid multiplication of two multiple-precision operands. A first multiple-precision operand 101 (multiplicand) includes the operand words a3, a2, a1, and a0. A second multiple-precision operand 102 (multiplier) includes the operand words b3, b2, b1, and b0. For the depiction of FIG. 1, the partial row width parameter has been defined as two, and operand size is n=4. Since the partial row width has been defined as two, two partial row partial products are determined at a time. FIG. 1 also depicts an accumulator 103 that includes registers r4, r3, r2, r1, and r0, each of bit width k. The parameter can be selected based on the operand size n and the amount of available register space. Performance of the hybrid multiple-precision multiplication can be optimized for a platform with r available registers by defining the tuning parameter in accordance with parameter (d)=max{i|1≦i≦n, r≧3i+1+⌈$\log_2(n/i)/k$⌉}.

In the following, it is assumed that n is a multiple of d. If n is not a multiple of d, multiplicand and multiplier can be padded with leading zeros such that n becomes a multiple of d. At the beginning of the exemplary hybrid multiplication, registers r4, r3, r2, r1, and r0 are initialized to zero setting accumulator 103 to zero. The first partial product is a0*b0, which is the same in either row-wise or column-wise multiplication. This first partial product (a0*b0) is accumulated in registers r0 and r1, that is the lower portion of partial product a0*b0 is added to register r0 and the higher portion is added to register r1. The second partial product is a1*b0, which is the second partial product of the first partial row. The lower portion of a1*b0 is added to register r1 and the higher portion is added to r2. If the addition of the lower portion of partial product a1*b0 and register r1 produces a carry bit, this carry bit may either be added to register r2 or to the higher portion of the next partial product. Since the tuning parameter determines the number of partial products in a partial row and has been defined as two, a1*b0 is also the last partial product of the first partial row. The third partial product is a0*b1, which is the first partial product of the second partial row. The third partial product, a0*b1, is added to registers r1 and r2. If the addition of the lower portion of partial product a0*b1 and register r1 produces a carry bit, this carry bit may either be added to register r2 or to the lower portion of the next partial product. If the addition of the higher portion of a0*b1 and r2 produces a carry bit, this carry bit may either be added to register r3 or to the higher portion of the next partial product. The fourth partial product (a1*b1) is the second and last partial product of the second partial row, and is added to registers r2 and r3. The fourth partial product, a1*b1, is also the last partial product of the first column. That is, partial products a0*b0, a1*b0, a0*b1, and a1*b1 constitute the first column.

Upon completion of a column, the lower portion of the accumulated sum of partial products for the completed column is stored to memory. Subsequently, the higher portion of the accumulated sum is shifted to the lower portion and the higher portion is set to zero. Realizations of the described invention may implicitly shift the accumulated sum (e.g., utilizing renaming), for instance, if the accumulator is comprised of multiple registers. Upon completion of the first column, registers r0 and r1 are stored to memory. Subsequently, r2 is copied to r0, r3 is copied to r1, and r4 is copied to r2. r4 and r3 are then set to zero. The fifth partial product a2*b0 is of the second column and the first partial row within the second column. a2*b0 is added to registers r0 and r1. Carry propagation is carried out as described for the first column by adding carry bits of additions either to the next higher register or the next partial product. The sixth partial product a3*b0 is added to r1 and r2 and completes the first partial row of the second column. The hybrid multiplication continues and generates and accumulates partial products a2*b1 and a3*b1 for the second partial row, a0*b2 and a1*b2 for the third partial row and a0*b3 and a1*b3 for the fourth partial row, respectively. As for the first column, upon completion of the second column, registers r0 and r1 are stored to memory. Subsequently, r2 is copied to r0, r3 is copied to r1, and r4 is copied to r2. r4 and r3 are then set to zero. Finally, the hybrid multiplication generates and accumulates partial products a2*b2 and a3*b2 for the first partial row of the third column and partial products a2*b3 and a3*b3 for the second partial row of the third column. Upon completion of the third column, registers r0, r1, r2, and r3 are stored to memory (register r4 will be zero at this point).

Generally, the number of accumulator registers to perform hybrid multiple-precision multiplication is determined with the following: 2d+⌈$\log_2(n/d)/k$⌉. The number of registers to hold words of the multiplicand and the multiplier is d+1. The total number of registers can be expressed as $3d+1+\lceil \log_2(n/d)/k \rceil$. This hybrid multiple-precision multiplication performs $2n^2/d$ memory load operations and $2n$ memory store operations. The total number of memory operations for hybrid multiplication can be expressed as $2n^2/d+2n$. Hence, it can be seen that the number of registers and the number of memory operations will vary with the hybrid multiplication parameter. In addition, the hybrid multiplication scales to a wide range of operand sizes n without requiring additional register space, which facilitates implementation of algorithms, such as RSA and ECC for multiple key sizes. In particular, for most applications the term $\lceil \log_2(n/d)/k \rceil$ will be one.

Figure 2A:
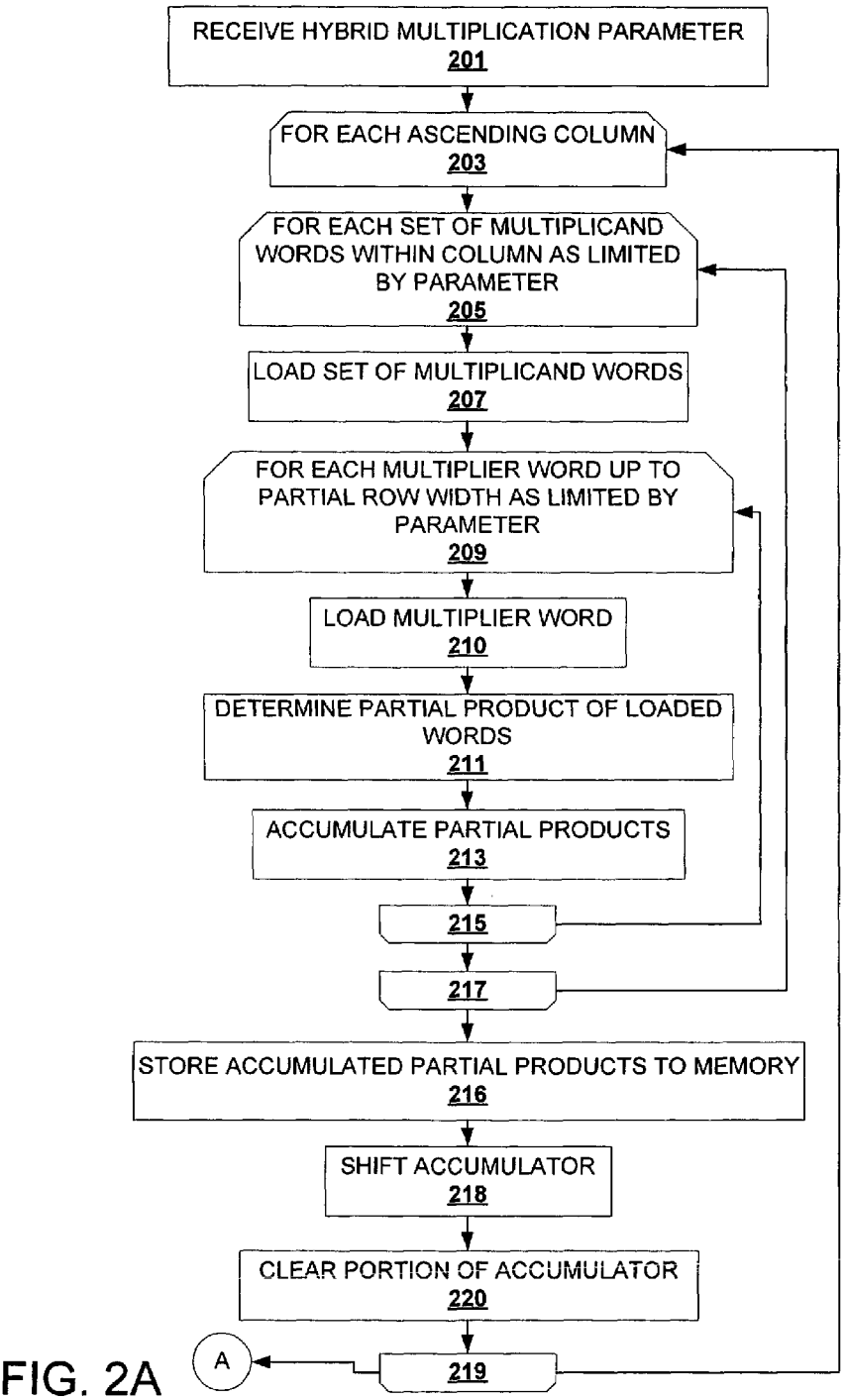
FIGS. 2A-2B depict an exemplary flowchart for hybrid multiple-precision multiplication.
Figure 2B:
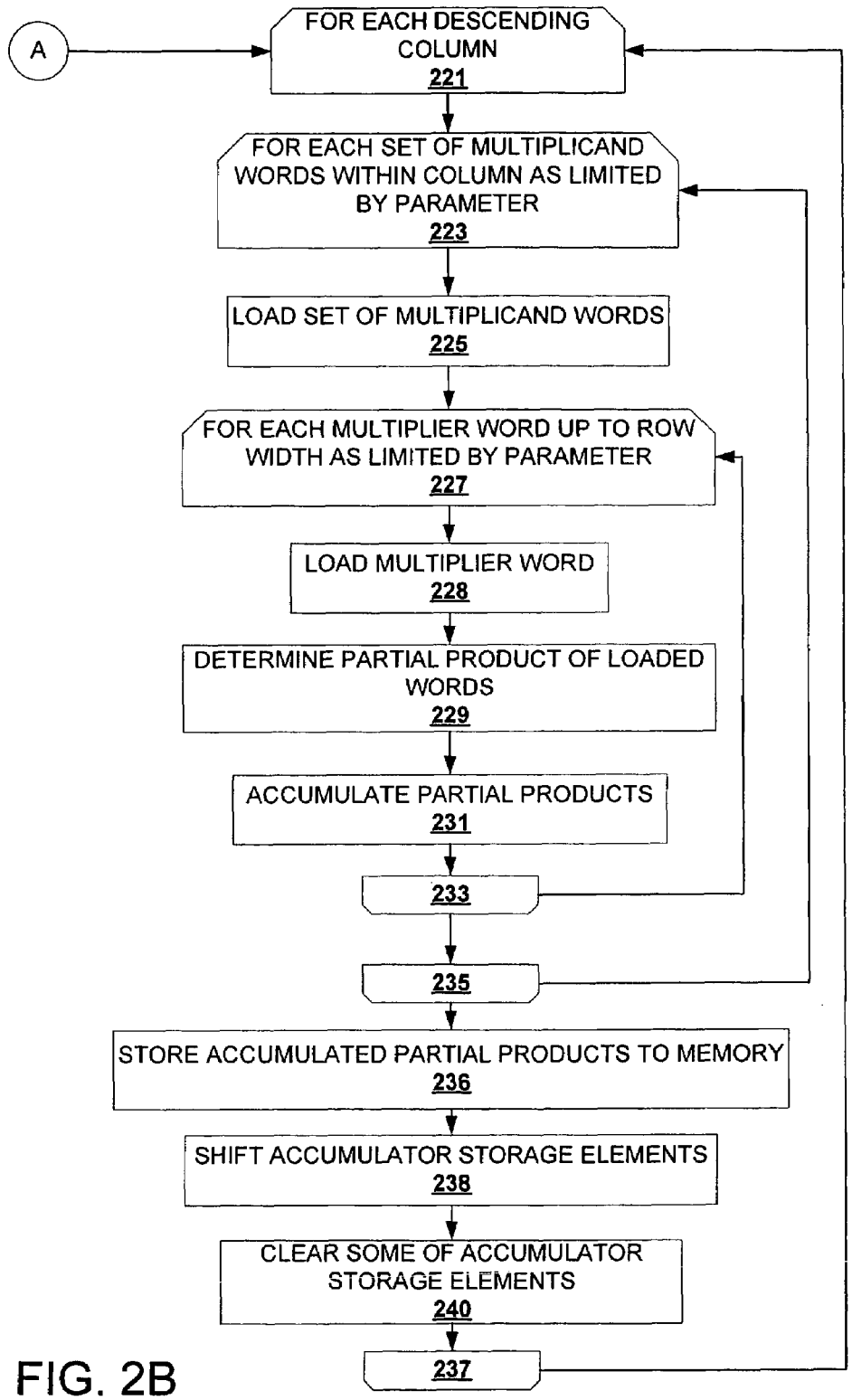

FIGS. 2A-2B depict an exemplary flowchart for hybrid multiple-precision multiplication. For a multiple-precision multiplicand and a multiple-precision multiplier consisting of n processor words each, and a chosen tuning parameter d, the hybrid multiplication method computes $n^2$ partial products arranged into $2(n/d)-1$ columns. In the following, the first n/d columns are referred to as ascending columns, while the remaining n/d−1 columns are referred to as descending columns. FIG. 2A depicts an exemplary flowchart for hybrid multiple-precision multiplication for ascending column partial products. At block 201, a hybrid multiplication parameter is received. The parameter may be generated by code resident on a target platform, code that analyzes operand word size and available register space of a target platform, input by a user, etc. At block 203, a loop control begins for ascending column. At block 205, an inner loop begins for each set of multiplicand words within a column as limited by the received parameter. At block 207, a set of multiplicand words is loaded. At block 209, another loop begins for each multiplier word up to row width as limited by the received parameter. At block 210, the multiplier word is loaded. At block 211, partial products of the loaded words are determined. At block 213, the determined partial products are accumulated. Block 215 terminates the loop begun at block 209. Block 217 terminates the loop begun at block 205. At block 216, the accumulated partial products are stored to memory. At block 218, accumulated partial products are shifted out of the accumulator. At block 220, a portion of the accumulator is cleared. Block 219 terminates the loop begun at block 203. Upon termination of the ascending column loop, control flows to block 221 of FIG. 2B.

FIG. 2B depicts an exemplary flowchart that continues from FIG. 2A for a descending column loop. Block 221 begins a loop for a descending column. Block 223 begins a loop for each set of multiplicand words within a column as limited by the received parameter. At block 225, a set of multiplicand words are loaded. At block 227, a loop begins for each multiplier word up to row width as limited by the received parameter. At block 228, a multiplier word is loaded. At block 229, one or more partial products of the loaded words are determined. At block 231, the determined partial products are accumulated. Block 233 terminates the loop controlled by block 227. Block 235 terminates the loop controlled by block 223. At block 236, at least some of the accumulated partial products are stored to memory. At block 238, at least some of the storage elements of the accumulator are shifted. At block 240, a some of the accumulator storage elements are cleared. Block 237 terminates the descending column loop.

While the flow diagrams show a particular order of operations performed by certain realizations of the invention, it should be understood that such order is exemplary (e.g., alternative realizations may perform the operations in a different order, combine certain operations, overlap certain operations, perform certain operations in parallel, etc.).

The following is exemplary pseudocode to implement hybrid multiplication, such as that depicted in FIGS. 2A-2B. The two outer nested loops describe column-wise multiplication and the two inner nested loops describe row-wise multiplication. Multiplicand and multiplier are located in memory locations mem_a and mem_b and are temporarily loaded into registers $a_{d-1}, \ldots, a_0$ and b. The result is accumulated in registers $r_{2d-1+\lceil \log_2(n/d)/k \rceil}, \ldots, r_0$, where the lower d registers are stored to result memory location mem_c at the end of each column.

```
Input:
    n              : operand size in words
    d              : column width
    mem_a [[n/d]*d−1..0] : multiplicand A
    mem_b [[n/d]*d−1..0] : multiplier B
Output:
    mem_c [[n/d]*2d−1..0] : result C = A * B
for i=0 to [n/d]−1
    for j=0 to i
        (a_{d−1},...,a_0) = mem_a[(i−j+1)*d−1..(i−j)*d]
        for s=0 to d−1
            b = mem_b[j*d+s]
            for t=0 to d−1
                (r_{2d−1+⌈log₂(n/d)/k⌉},..., r_0) = (r_{2d−1+⌈log₂(n/d)/k⌉},..., r_0) +
                                                    a_t * b * 2^{k*(t+s)}
    mem_c[(i+1)*d..i*d] = (r_{d−1},..., r_0)
    (r_{d−1+⌈log₂(n/d)/k⌉},..., r_0) = (r_{2d−1+⌈log₂(n/d)/k⌉},..., r_d)
    (r_{2d−1+⌈log₂(n/d)/k⌉},..., r_d) = 0
for i=⌈n/d⌉ to 2⌈n/d⌉−2
    for j=i−⌈n/d⌉+1 to ⌈n/d⌉−1
        (a_{d−1},..., a_0) = mem_a[(i−j+1)*d−1...(i−j)*d]
        for s=0 to d−1
            b = mem_b[j*d+s]
            for t=0 to d−1
                (r_{2d−1+⌈log₂(n/d)/k⌉},..., r_0) = (r_{2d−1+⌈log₂(n/d)/k⌉},..., r_0) +
                                                    a_t * b * 2^{k*(t+s)}
    mem_c[(i+1)*d .. i*d] = (r_{d−1},..., r_0)
    (r_{d−1+⌈log₂(n/d)/k⌉},..., r_0) = (r_{2d−1+⌈log₂(n/d)/k⌉},..., r_d)
    (r_{2d−1+⌈log₂(n/d)/k⌉},..., rd) = 0
mem_c[(i+1)*d .. i*d] = (r_{d−1},..., r_0)
```

Figure 3:
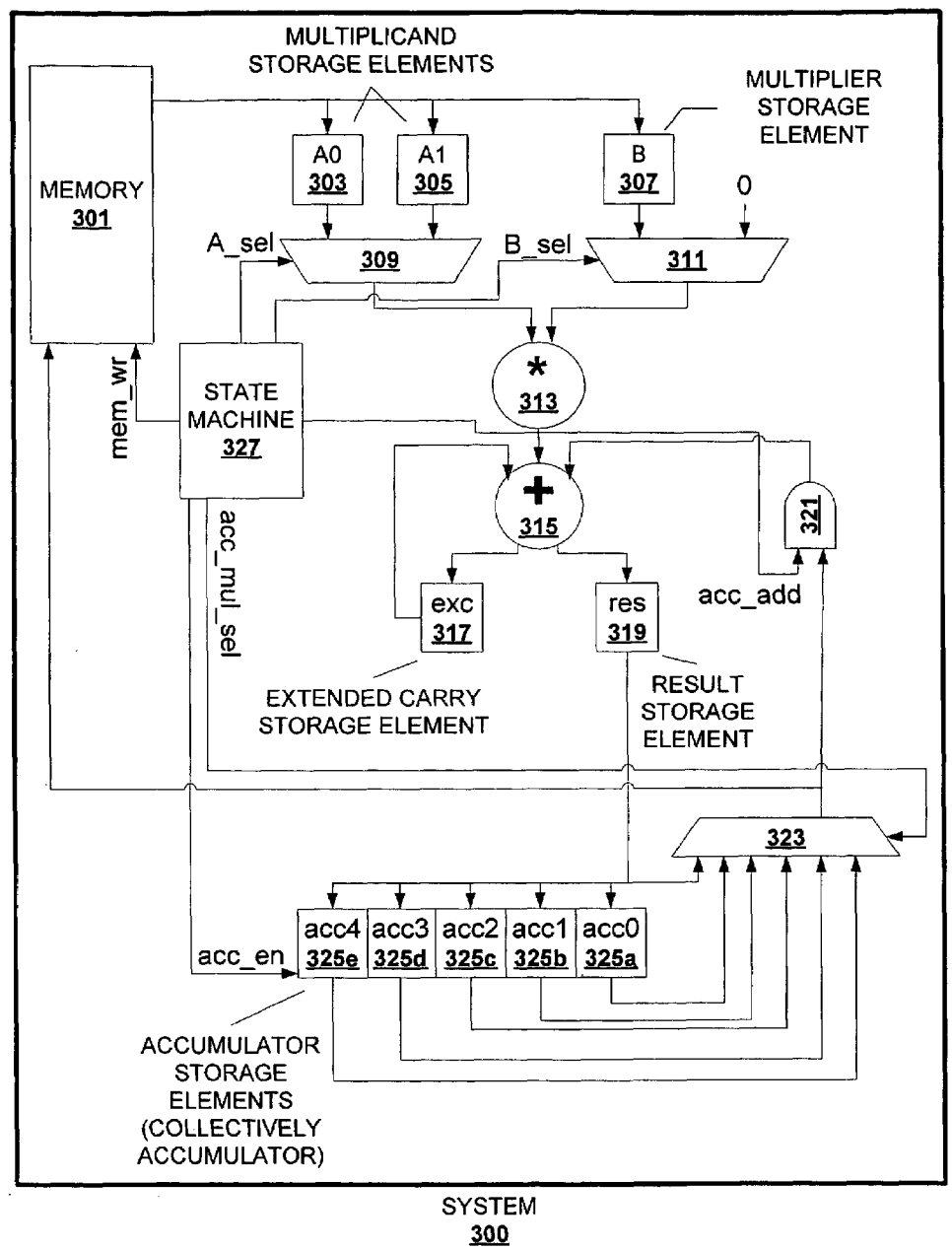
FIG. 3 depicts an exemplary system implementing hybrid multiplication.
Figure 4:
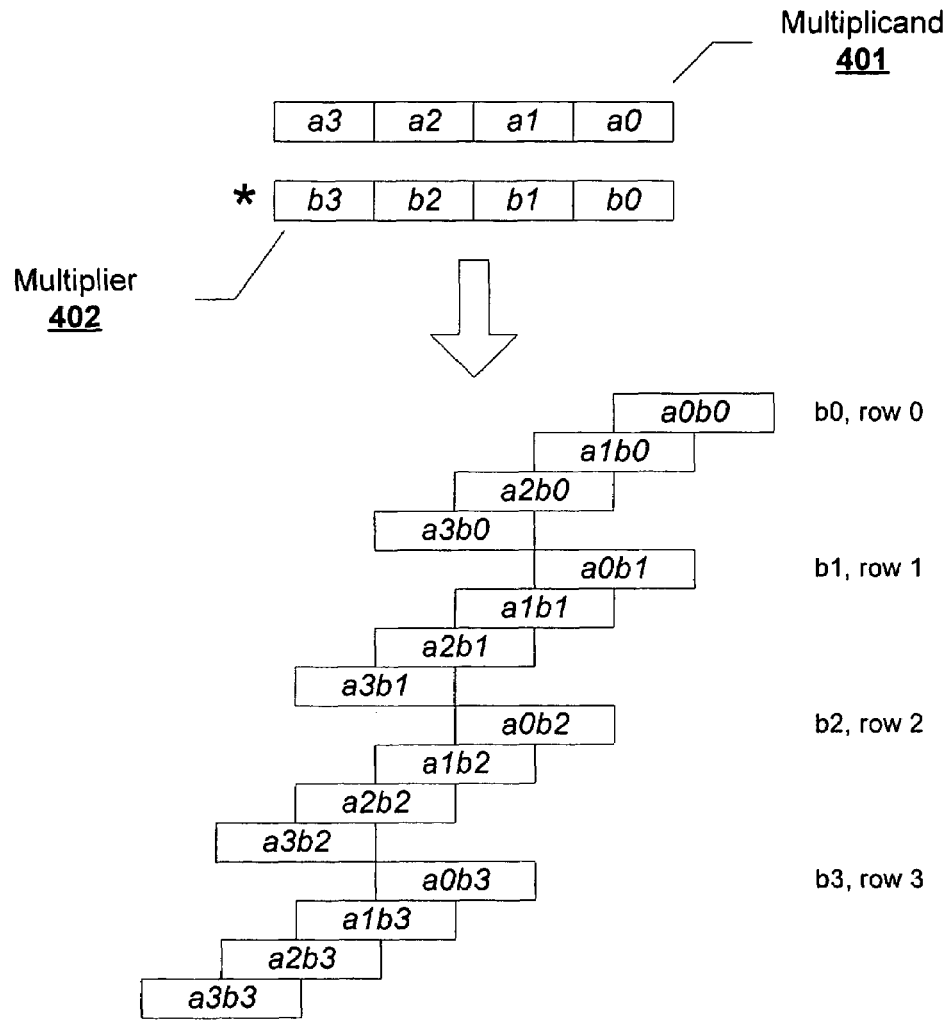
FIG. 4 depicts an illustrative example of row-wise multiplication with a multiplicand 401 and a multiplier 402.

FIG. 3 depicts an exemplary system implementing hybrid multiplication for a chosen parameter value of d=2. Although the parameter d may be selected in accordance with an already produced system, a system may be designed based, at least in part, on the a desired parameter d. In FIG. 3, a system 300 includes a memory 301, operand storage elements 303, 305, 307, and selection units 309, 311, 323. The system 300 also includes a multiplication unit 313, an addition unit 315, an extended carry storage element 317, a partial product storage element 319, AND gates 321, accumulator storage elements 325a-325e, and a state machine 327. The memory 301 is coupled with the operand storage elements 303, 305, and 307, the state machine 327, and the selection unit 323. The operand storage elements 303 and 305 are coupled with the selection unit 309. The operand storage element 307 is coupled with the selection unit 311. The selection units 309 and 311 are coupled to supply output to the multiplication unit 313. The multiplication unit 313 is coupled to output to the addition unit 315. The addition unit 315 is coupled to output the higher portion of the addition result to the extended carry storage element 317 and the lower portion of the addition result to the result storage element 319. The extended carry storage element 317 is coupled to output to the addition unit 315. The addition unit 315 is also coupled to receive input from the AND gates 321. For a data path width of x bits, the AND gates 321 would include x AND gates. The result storage element 319 is coupled to output to the accumulator storage elements 325a-325e and to the selection unit 323. The coupling of the result storage element 319 to the selection unit 323 may be used to implement Montgomery modular multiplication. Realizations of the described invention may not couple the result storage element 319 with the selection unit 323. The accumulator storage elements 325a-325e are coupled to output to the selection unit 323 also. The selection unit 323 is coupled to output to the AND gates 321 and to the memory 301.

In addition to the memory 301, the state machine 327 is coupled with the selection units 309, 311, and 323. The state machine 327 is also coupled with the AND gate 321 and the accumulator storage elements 325a-325e. The state machine 327 supplies control values to the various components of the system 300 to implement hybrid multiple-precision multiplication. The state machine 327 supplies control values to the selection units 309 and 311 to select an appropriate operand value. The state machine 327 supplies control values to the AND gates 321 to indicate when values from the accumulator storage elements 325a-325e should be provided as input to the addition unit 315 and added to a partial product generated by the multiplication unit 313. The state machine 327 supplies control values to the selection unit 323 to indicate which of the accumulator storage elements 325a-325e should be selected as input to the addition unit 315. The state machine 327 supplies control values to the accumulator storage elements 325a-325e to enable writing to particular ones of the accumulator storage elements 325a-325e. The state machine 327 supplies control values to the memory 301 to indicate when values from the accumulator storage elements 325a-325e should be stored to memory. Although not shown in FIG. 3, state machine 327 may also be coupled with operand storage elements 303, 305, 307, and may have further control signals to memory 301 to control the loading of operand values.

Table 1 depicts exemplary control values supplied by a state machine. The table depicts control values supplied by the state machine 327 for the example hybrid multiplication depicted in FIG. 1.

TABLE 1

Control Values from State Machine for Hybrid Multiplication

| cycle | A_sel | B_sel | acc_add | acc_en[4:0] | acc_mul_sel | mem_wr |
|---|---|---|---|---|---|---|
| 0 | X | 0 | 0 | X | X | 0 |
| 1 | X | 0 | 0 | X | X | 0 |
| 2 | A0 | B | 0 | X | X | 0 |
| 3 | A1 | B | 0 | acc0 | X | 0 |
| 4 | X | 0 | 0 | acc1 | acc0 | 1 |
| 5 | A0 | B | 1 | acc2 | acc1 | 0 |
| 6 | A1 | B | 1 | acc1 | acc2 | 0 |
| 7 | X | 0 | 0 | acc2 | acc1 | 1 |
| 8 | A0 | B | 1 | acc3 | acc2 | 0 |
| 9 | A1 | B | 1 | acc0 | acc3 | 0 |
| 10 | X | 0 | 0 | acc1 | X | 0 |
| 11 | A0 | B | 1 | acc2 | acc1 | 0 |
| 12 | A1 | B | 1 | acc1 | acc2 | 0 |
| 13 | X | 0 | 0 | acc2 | X | 0 |
| 14 | A0 | B | 1 | acc3 | acc0 | 0 |
| 15 | A1 | B | 1 | acc0 | acc1 | 0 |
| 16 | X | 0 | 1 | acc1 | acc2 | 0 |
| 17 | X | 0 | 1 | acc2 | acc3 | 0 |
| 18 | X | 0 | 0 | acc3 | acc0 | 1 |
| 19 | A0 | B | 1 | acc4 | acc1 | 0 |
| 20 | A1 | B | 1 | acc1 | acc2 | 0 |
| 21 | X | 0 | 1 | acc2 | acc3 | 0 |
| 22 | X | 0 | 1 | acc3 | acc4 | 0 |
| 23 | X | 0 | 0 | acc4 | acc1 | 1 |
| 24 | A0 | B | 1 | 0 | acc2 | 0 |
| 25 | A1 | B | 1 | acc0 | acc3 | 0 |
| 26 | X | 0 | 1 | acc1 | acc4 | 0 |
| 27 | X | 0 | 0 | acc2 | acc0 | 1 |
| 28 | A0 | B | 1 | acc3 | acc1 | 0 |
| 29 | A1 | B | 1 | acc1 | acc2 | 0 |
| 30 | X | 0 | 1 | acc2 | acc3 | 0 |
| 31 | X | 0 | 0 | acc3 | acc1 | 1 |
| 32 | X | 0 | 0 | 0 | acc2 | 1 |
| 33 | X | 0 | 0 | 0 | acc3 | 1 |

Beginning in the second cycle until the twenty-ninth cycle, the state machine alternates selection of the multiplicand operand between the words stored in the storage elements 303 and 305 (i.e., alternate between A0 and A1), and intermittently does not select an operand (there is no selection or output from the selection unit at cycles 4, 7, 10, 13, 16-18, 21-23, and 26-27). For the same cycles that a word from the storage elements 303 and 305 are being selected, the state machine 327 supplies a control value that causes selection of the multiplier word. Table 2 illustrates the values being stored in the various storage elements over the course of the hybrid multiplication.

TABLE 2

Values at different cycles for hybrid multiple-precision multiplication

| cycle | A1 | A0 | B | Partial row partial product | Extended carry storage element | Result storage element |
|---|---|---|---|---|---|---|
| 0 | X | X | X |  | X | X |
| 1 | X | X | b0 |  | 0 | 0 |
| 2 | X | a0 | b0 | a0 * b0 | 0 | 0 |
| 3 | a1 | a0 | b0 | a1 * b0 | a0 * b0[hi] | a0 * b0[lo] |
| 4 | a1 | a0 | b1 |  | (a1 * b0 + exc)[hi] | (a1 * b0 + exc)[lo] |
| 5 | a1 | a0 | b1 | a0 * b1 | 0 | exc |
| 6 | a1 | a2 | b1 | a1 * b1 | (a0 * b1 + acc1)[hi] | (a0 * b1 + acc1)[lo] |
| 7 | a1 | a2 | b0 |  | (a1 * b1 + acc2 + exc)[hi] | (a1 * b1 + acc2 + exc)[lo] |
| 8 | a3 | a2 | b0 | a2 * b0 | 0 | exc |
| 9 | a3 | a2 | b0 | a3 * b0 | (a2 * b0 + acc2)[hi] | (a2 * b0 + acc2)[lo] |
| 10 | a3 | a2 | b1 |  | (a3 * b0 + acc3)[hi] | (a3 * b0 + acc3)[lo] |
| 11 | a3 | a2 | b1 | a2 * b1 | 0 | exc |
| 12 | a3 | a0 | b1 | a3 * b1 | (a2 * b1 + acc1)[hi] | (a2 * b1 + acc1)[lo] |
| 13 | a3 | a0 | b2 |  | (a3 * b1 + acc2 + exc)[hi] | (a3 * b1 + acc2 + exc)[lo] |
| 14 | a1 | a0 | b2 | a0 * b2 | 0 | exc |
| 15 | a1 | a0 | b2 | a1 * b2 | (a0 * b2 + acc0)[hi] | (a0 * b2 + acc0)[lo] |
| 16 | a1 | a0 | b3 |  | (a1 * b2 + acc1)[hi] | (a1 * b2 + acc1)[lo] |
| 17 | a1 | a0 | b3 |  | (acc2 + exc)[hi] | (acc2 + exc)[lo] |
| 18 | a1 | a0 | b3 |  | (acc3 + exc)[hi] | (acc3 + exc)[lo] |
| 19 | a1 | a0 | b3 | a0 * b3 | 0 | exc |
| 20 | a1 | a2 | b3 | a1 * b3 | (a0 * b3 + acc1)[hi] | (a0 * b3 + acc1)[lo] |
| 21 | a3 | a2 | b3 |  | (a1 * b3 + acc2)[hi] | (a1 * b3 + acc2)[lo] |
| 22 | a3 | a2 | b2 |  | (acc3 + exc)[hi] | (acc3 + exc)[lo] |
| 23 | a3 | a2 | b2 |  | 0 | acc4 + exc |
| 24 | a3 | a2 | b2 | a2 * b2 | 0 | 0 |
| 25 | a3 | a2 | b2 | a3 * b2 | (a2 * b2 + acc2)[hi] | (a2 * b2 + acc2) [lo] |
| 26 | a3 | a2 | b3 |  | (a3 * b2 + acc3)[hi] | (a3 * b2 + acc3)[lo] |
| 27 | a3 | a2 | b3 |  | (acc4 + exc)[hi] | (acc4 + exc)[lo] |
| 28 | a3 | a2 | b3 | a2 * b3 | 0 | exc |
| 29 | a3 | a2 | b3 | a3 * b3 | (a2 * b3 + acc1)[hi] | (a2 * b3 + acc1)[lo] |
| 30 | a3 | a2 | b3 |  | (a3 * b3 + acc2)[hi] | (a3 * b3 + acc2)[lo] |
| 31 | a3 | a2 | b3 |  | 0 | exc |
| 32 | a3 | a2 | b3 |  | 0 | 0 |
| 33 | a3 | a2 | b3 | 0 | 0 |  |

For the acc_add control value, the state machine 327 supplies a control value that causes addition of a value to a partial product from the multiplication unit 313 at cycles 5 through 30, with the exception of cycles 7, 10, 13, 18, 23, and 27. The value being added to the partial products is dictated by the acc_mul_sel control value supplied by the state machine 327. At cycles 5, 6, 8, 9, 11, 12, 14-17, 19-22, 24-26, and 28-30 an intermediate result from one of the accumulator storage elements is added to the currently generated partial product. The state machine 327 provides control values that enable the appropriate one of the accumulator storage elements 325a-325d to host a partial row partial product from the result storage element 319. Lastly, the state machine 327 provides control values that cause store memory operations at cycles 4, 7, 18, 23, 27, and 31-33, respectively from accumulator storage element 325a, accumulator storage element 325b, accumulator storage element 325a, accumulator storage element 325b, accumulator storage element 325a, accumulator storage element 325b, accumulator storage element 325c, and accumulator storage element 325d. Thus, the system 300 implementing the exemplary hybrid multiple-precision multiplication of FIG. 1 performs eight store memory operations, which conforms to the already stated 2n memory store operations for hybrid multiplication. System 300 also performs 16 memory load operation conforming with the $2n^2/d$ memory load operations for hybrid multiplication as stated earlier. In comparison, a system using column-wise multiplication would require 32 memory load operations for the same multiple-precision multiplication.

Figure 5:
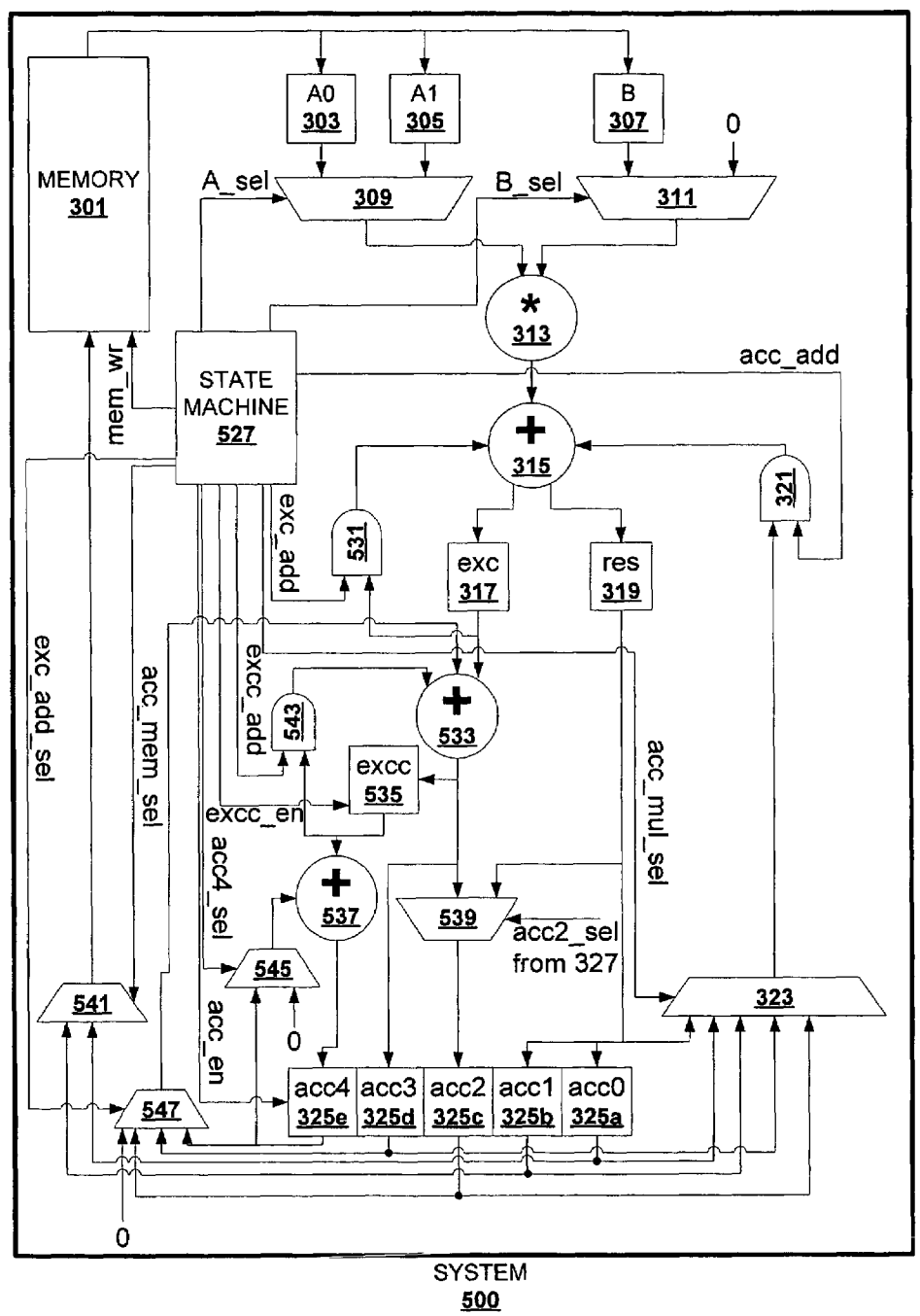
FIG. 5 depicts an exemplary system for hybrid multiple-precision multiplication that optimizes carrying.
Figure 6:
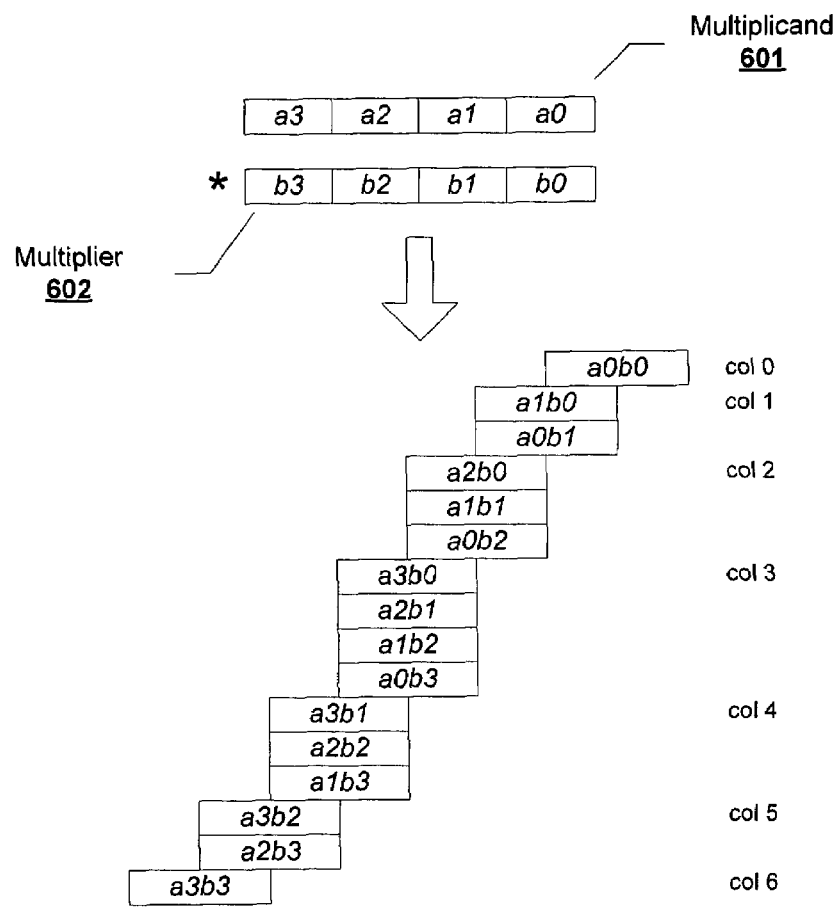
FIG. 6 depicts an illustrative example of column-wise multiplication with a multiplicand 601 and a multiplier 602.

FIG. 5 depicts an exemplary system for hybrid multiple-precision multiplication that optimizes carrying. The elements of system 500 depicted in FIG. 5 are the same as the elements of the system 300 in FIG. 3, with additional elements and different couplings for handling carries. The additional elements include an extended carry overflow storage element 535, an addition unit 533, AND gates 543 and AND gates 531 (similar to the AND gates 321 of FIG. 3), and selection units 539, 545, 541, and 547.

In FIG. 5, the extended carry storage element 317 is coupled to output to the addition unit 533, instead of back to the addition unit 315 as in FIG. 3. The extended carry storage element 317 is also coupled to output to the AND gates 531. The addition unit 533 is coupled to receive input from the extended carry storage element 317, the selection unit 547, and the AND gate 543. The addition unit 533 is coupled to output to the selection unit 539, to the accumulator storage element 325d, and a single bit to the extended carry overflow storage element 535. The selection unit 539 is also coupled to receive input from the result storage element 319. The selection unit 539 is coupled to output to the accumulator storage element 325c. The extended carry overflow storage element 535 is coupled to output to the AND gate 543 and the addition unit 537. The addition unit 537 also receives input from the selection unit 545. The addition unit 537 is coupled to output to the accumulator storage element 325e. The selection unit 545 is coupled to receive input from the accumulator storage element 325e and a zero value. The selection unit 547 is coupled to receive input from the accumulator storage elements 325c-325e and a zero value. The selection unit 541 is coupled to receive input from the accumulator storage elements 325a-325b. In contrast to FIG. 3, the accumulator storage elements 325a-325b are coupled to output to both the selection units 323 and 541. Also, the selection unit 323 is not coupled to output to the memory 301, but the selection unit 541 is coupled to output to the memory 301. Another difference is that the accumulator storage element 325e is not coupled with the selection unit 323, but is coupled to output to the selection units 545 and 547.

The selection unit 539 selects whether the output from the addition unit 533 or the results storage element 319 will be stored in the accumulator 325c. The selection unit 541 selects which output from the accumulator storage elements 325a and 325b will be written to memory. The selection unit 545 selects whether a zero value or input from the accumulator storage element 325e is output to the addition unit 537. The selection unit 547 selects which of a zero value and the accumulator storage elements 325c-325e will be output to the addition unit 533. The following table 4 indicates exemplary 325b to selection units 309 or 311, and by connecting storage element 319 to selection unit 541.

Similar to FIG. 3, the state machine 527 is coupled to control output of the selection units 309 and 311, as well as the selection unit 323. The state machine 527 is coupled to control output of the AND gates 531 and AND gates 543, and the selection units 539, 541, 545, 547. The state machine 527 is also coupled to write enable the extended carry overflow storage element 535, with a control value excc_en. The state machine 527 regulates whether the AND gates 531 allow input from the extended carry storage element 317 to be supplied to the addition unit 315 with a control value exc_add. The state machine 527 regulates whether the AND gate 543 allows input from the extended carry overflow storage element 535 to be supplied to the addition unit 533 with a control value excc_add. The state machine 527 controls the selection units 539, 541, 545, and 547 with the control values acc2_sel, acc_mem_sel, acc4_sel, and exc_add_sel. Table 3 below indicates exemplary control values for the exemplary hybrid multiple-precision multiplication illustrated in FIG. 1.

TABLE 3

Control Values from State Machine for Hybrid Multiplication

| Cycle | A_sel | B_sel | exc add | acc add | Excc_add | excc_en | acc_en [4:0] | acc2_sel | acc4_sel | acc_mul_sel | acc_mem_sel | exc_add_sel | mem_wr |
|---|---|---|---|---|---|---|---|---|---|---|---|---|---|
| 0 | X | 0 | 0 | 0 | X | X | X | X | X | X | X | X | 0 |
| 1 | X | 0 | 0 | 0 | X | 0 | X | X | X | X | X | X | 0 |
| 2 | A0 | B | 0 | 0 | X | 1 | X | X | 0 | X | X | X | 0 |
| 3 | A1 | B | 1 | 0 | 0 | 0 | acc0, acc4 | X | 0 | X | X | X | 0 |
| 4 | A0 | B | 0 | 1 | 0 | 1 | acc2 | exc | 0 | res | X | acc4 | 0 |
| 5 | A1 | B | 1 | 1 | 0 | 0 | acc1 | X | acc4 | acc2 | acc0 | 0 | 1 |
| 6 | A0 | B | 0 | 1 | 1 | 1 | acc3 | X | acc4 | res | acc1 | 0 | 1 |
| 7 | A1 | B | 1 | 1 | 0 | 0 | acc0, acc4 | X | acc4 | acc3 | X | 0 | 0 |
| 8 | A0 | B | 0 | 1 | 0 | 1 | acc2 | exc | 0 | res | X | acc4 | 0 |
| 9 | A1 | B | 1 | 1 | 0 | 0 | acc1 | X | acc4 | acc2 | X | 0 | 0 |
| 10 | A0 | B | 0 | 1 | 1 | 1 | acc2, acc3 | res | acc4 | acc0 | X | 0 | 0 |
| 11 | A1 | B | 1 | 1 | 0 | 0 | acc0, acc4 | X | acc4 | acc1 | X | 0 | 0 |
| 12 | A0 | B | 0 | 1 | 0 | 1 | acc2 | exc | acc4 | res | X | acc2 | 0 |
| 13 | A1 | B | 1 | 1 | 0 | 0 | acc1 | X | acc4 | acc2 | acc0 | 0 | 1 |
| 14 | A0 | B | 0 | 1 | 1 | 1 | acc3 | X | acc4 | res | acc1 | acc3 | 1 |
| 15 | A1 | B | 1 | 1 | 0 | 0 | acc0, acc4 | X | acc4 | acc3 | X | 0 | 0 |
| 16 | A0 | B | 0 | 1 | 0 | 1 | acc2 | exc | 0 | res | X | acc4 | 0 |
| 17 | A1 | B | 1 | 1 | 0 | 0 | acc1 | X | acc4 | acc2 | acc0 | 0 | 1 |
| 18 | X | 0 | 0 | 1 | 1 | 1 | acc2, acc3 | res | acc4 | res | acc1 | 0 | 1 |
| 19 | X | 0 | 0 | 1 | X | X | acc0, acc4 | X | acc4 | acc3 | X | 0 | 0 |
| 20 | X | 0 | 0 | X | X | X | acc1 | X | acc4 | X | acc0 | 0 | 1 |
| 21 | X | X | X | X | X | X | X | X | acc4 | X | acc1 | 0 | 1 | values stored in elements of the system illustrated in FIG. 5 over the course of the hybrid multiple-precision multiplication shown in FIG. 1. Note that the control values supplied to the systems 300 and 500 through state machines 327 and 527, respectively, are exemplary and that different control values may be supplied. In particular, state machines 327 and 527 may supply control values to implement Montgomery modular multiplication using the hybrid multiplication method described herein. In addition, systems 300 and 500 may be extended to better support Montgomery modular multiplication, for example, by connecting storage elements 325a and

TABLE 4

Values at different cycles for hybrid multiple-precision multiplication

| cycle | A1 | A0 | B | Partial row partial product | exc | res |
|---|---|---|---|---|---|---|
| 0 | X | X | X | 0 | X | X |
| 1 | X | X | b0 | 0 | 0 | 0 |
| 2 | X | a0 | b0 | a0 * b0 | 0 | 0 |
| 3 | a1 | a0 | b0 | a1 * b0 | a0 * b0 + ... [hi] | a0 * b0 + ... [lo] |

TABLE 4-continued

Values at different cycles for hybrid multiple-precision multiplication

| cycle | A1 | A0 | B | Partial row partial product | exc | res |
|---|---|---|---|---|---|---|
| 4  | a1 | a0 | b1 | a0 * b1 | a1 * b0 + ... [hi] | a1 * b0 + ... [lo] |
| 5  | a1 | a2 | b1 | a1 * b1 | a0 * b1 + ... [hi] | a0 * b1 + ... [lo] |
| 6  | a3 | a2 | b0 | a2 * b0 | a1 * b1 + ... [hi] | a1 * b1 + ... [lo] |
| 7  | a3 | a2 | b0 | a3 * b0 | a2 * b0 + ... [hi] | a2 * b0 + ... [lo] |
| 8  | a3 | a2 | b1 | a2 * b1 | a3 * b0 + ... [hi] | a3 * b0 + ... [lo] |
| 9  | a3 | a0 | b1 | a3 * b1 | a2 * b1 + ... [hi] | a2 * b1 + ... [lo] |
| 10 | a1 | a0 | b2 | a0 * b2 | a3 * b1 + ... [hi] | a3 * b1 + ... [lo] |
| 11 | a1 | a0 | b2 | a1 * b2 | a0 * b2 + ... [hi] | a0 * b2 + ... [lo] |
| 12 | a1 | a0 | b3 | a0 * b3 | a1 * b2 + ... [hi] | a1 * b2 + ... [lo] |
| 13 | a1 | a2 | b3 | a1 * b3 | a0 * b3 + ... [hi] | a0 * b3 + ... [lo] |
| 14 | a3 | a2 | b2 | a2 * b2 | a1 * b3 + ... [hi] | a1 * b3 + ... [lo] |
| 15 | a3 | a2 | b2 | a3 * b2 | a2 * b2 + ... [hi] | a2 * b2 + ... [lo] |
| 16 | a3 | a2 | b3 | a2 * b3 | a3 * b2 + ... [hi] | a3 * b2 + ... [lo] |
| 17 | a3 | X  | b3 | a3 * b3 | a2 * b3 + ... [hi] | a2 * b3 + ... [lo] |
| 18 | X  | X  | X  | 0 | a3 * b3 + ... [hi] | a3 * b3 + ... [lo] |
| 19 | X  | X  | X  | 0 | 0 | acc2 |
| 20 | X  | X  | X  | 0 | 0 | acc3 |
| 21 | X  | X  | X  | 0 | 0 | X |

The described invention may be provided as a computer program product, or software, that may include a machine-readable medium having stored thereon instructions, which may be used to program a computer system (or other electronic devices) to perform a process according to the present invention. A machine readable medium includes any mechanism for storing or transmitting information in a form (e.g., software, processing application) readable by a machine (e.g., a computer). The machine-readable medium may include, but is not limited to, magnetic storage medium (e.g., hard disk drive); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other types of medium suitable for storing electronic instructions.

The systems depicted in FIGS. 3 and 5 may include a processor unit (possibly including multiple processors). The memories depicted in systems 300 and 500 may include one or more of cache, SRAM, DRAM, RDRAM, EDO RAM, DDR RAM, EEPROM, etc. The systems 300 and 500 may also include a system bus (e.g., LDT, PCI, ISA, etc.), a network interface (e.g., an ATM interface, an Ethernet interface, a Frame Relay interface, etc.), a storage device(s) (e.g., optical storage, magnetic storage, etc.), video cards, audio cards, additional network interfaces, and peripheral devices, etc. The state machines 327 and 527 may be implemented in the memory 301, a separate memory, micro-code stored on the processor and/or a code cache, etc.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. For example, the blocks and logic units identified in the description are for understanding the described invention and not meant to limit the described invention. Functionality may be separated or combined in blocks differently in various realizations of the invention or described with different terminology.

These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A computer-implemented method for performing multiple-precision multiplication on a target platform, the method comprising:
   accumulating partial products for a multiple-precision multiplicand operand and a multiple-precision multiplier operand in accordance with a configurable tuning parameter that associates partial product accumulation with the target platform, wherein the tuning parameter corresponds, at least in part, to availability of storage elements on the target platform; and
   generating a product of the operands with the accumulated partial products.

2. The method of claim 1, wherein the availability of storage elements includes the number of storage elements available for generation and accumulation of partial products.

3. The method of claim 1, wherein each of the operands comprises a number of words in accordance with the target platform.

4. The method of claim 3, wherein size of the words is in accordance with the target platform.

5. The method of claim 1, wherein each of the accumulated partial products is a product of one word of the multiple-precision multiplier operand and one or more words of the multiple-precision multiplicand operand.

6. The method of claim 5, wherein the partial product accumulation is in accordance with a hybrid of row-wise and column-wise multiplication.

7. The method of claim 6, wherein the partial products are determined as part of partial rows.

8. The method of claim 7, wherein a width of a partial row is the number of words of the multiple-precision multiplicand operand for a partial product, and wherein the partial row width is defined by the tuning parameter.

9. The method of claim 1, wherein the tuning parameter is determined in accordance with parameter(d)=max$\{i | 1 \leq i \leq n, r \geq 3i+1+\lceil \log_2(n/i)/k \rceil\}$, r indicating a number of storage elements available for operand words and partial product accumulation, n indicating number of words in an operand, and k indicating operand word size.

10. The method of claim 1 further comprising utilizing the generated product in performing a security operation.

11. The method of claim 10, wherein the security operation is an elliptic curve cryptography operation.

12. A machine-readable storage medium or memory storing program instructions usable to program a computer system to perform the method of claim 1.

13. The method of claim 1, wherein the operands include at least one of integers and binary polynomials.

14. The method of claim 1, wherein the multiple-precision multiplication is performed as part of a modular multiplication.

15. The method of claim 1, wherein the multiple-precision multiplication is performed as part of a Montgomery modular multiplication.

16. The method of claim 1, wherein the storage elements include registers.

17. A computer-implemented method, comprising:
accumulating partial products of a multiple-precision multiplicand and a multiple-precision multiplier in accordance with a hybrid of column wise and row-wise multiplication,
wherein the partial products accumulated are determined as part of partial rows, and
wherein the part of the row-wise partial products is defined by a configurable tuning parameter that associates partial product accumulation with a target platform, wherein the tuning parameter corresponds, at least in part, to availability of storage elements on the target platform.

18. The method of claim 17, wherein the width of the partial rows is defined by the tuning parameter.

19. The method of claim 18, wherein the partial row partial products are products of a multiplier operand word and a number of multiplicand operand words.

20. The method of claim 19, wherein the number of multiplicand operand words for a partial row partial product corresponds to the tuning parameter.

21. The method of claim 17, wherein the tuning parameter is determined in accordance with
parameter(d)=max$\{i|1 \leq i \leq n, \quad r \geq 3i+1+\lfloor \log_2(n/i)/k \rfloor\}$, r indicating a number of storage elements available for operand words and partial product accumulation, n indicating operand size, and k indicating operand word size.

22. The method of claim 17 further comprising generating a product with the accumulated partial products.

23. The method of claim 22 further comprising performing a security operation with the generated product.

24. A machine-readable storage medium or memory storing program instructions usable to program a computer system to perform the method of claim 17.

25. An apparatus, comprising:
storage elements; and
a hybrid multiplication circuit coupled to receive multiple precision operands from the storage elements, the hybrid multiplication circuit operable to perform a hybrid of row-wise multiplication and column-wise multiplication with received multiple precision operands in accordance with a configurable tuning parameter that associates partial product accumulation with the apparatus, wherein the tuning parameter corresponds, at least in part, to availability of the storage elements of the apparatus.

26. The apparatus of claim 25, wherein a first set of one or more of the storage elements store words of a first of the multiple precision operands and a second set of one or more of the storage elements store words of a second of the multiple precision operands.

27. The apparatus of claim 25, wherein the hybrid multiplication circuit includes a state machine coupled to supply control values for performing the hybrid multiplication.

28. The apparatus of claim 25, wherein the hybrid multiplication circuit includes an accumulator, wherein particular portions of the accumulator are enabled in accordance with the hybrid multiplication.

29. The apparatus of claim 25, wherein the hybrid multiplication unit includes a multiplication unit and an addition unit.

30. An apparatus, comprising:
a hybrid multiplication state machine operable to indicate control values for selection of input in accordance with hybrid multiplication, wherein the hybrid multiplication is a hybrid of column-wise and row-wise multiplication;
a first plurality of storage elements operable to accumulate partial products in accordance with a configurable tuning parameter that associates partial product accumulation with a target platform, wherein the tuning parameter corresponds, at least in part, to availability of storage elements on the target platform, the first plurality of storage elements coupled with the state machine to receive control values that enable particular ones of the first plurality of storage elements in accordance with the hybrid multiplication;
a first selection unit coupled with the first plurality of storage elements and the state machine, the first selection unit operable to select input from the first plurality of storage elements in accordance with control values from the state machine;
a second plurality of storage elements operable to host words of a multiple-precision multiplicand, the second plurality of storage elements being coupled with a multiplication unit;
a first storage element operable to host a word of a multiple-precision multiplier, the first storage element coupled with the multiplication unit;
a second selection unit coupled with the second plurality of storage elements and the state machine, the second selection unit operable to select input from the second plurality of storage elements in accordance with one or more control values indicated by the state machine;
the multiplication unit operable to multiply an output from the second selection unit and output from the first storage element;
an addition unit coupled with the multiplication unit and the first selection unit, the addition unit operable to add output from the multiplication unit and output from the first selection unit.

31. The apparatus of claim 30, wherein the state machine is instantiated as program instructions stored on one or more machine-readable storage media.

32. The apparatus of claim 30 further comprising the first selection unit selecting input from the first plurality of storage elements to provide to a memory.

33. The apparatus of claim 32, wherein the memory includes a dual port memory or a single port memory.

34. The apparatus of claim 30 further comprising an extended carry unit coupled with the addition unit.

35. The apparatus of claim 30, further comprising one or more paths and units to perform Montgomery modular multiplication.

36. The apparatus of claim 30, wherein the storage elements include registers.

37. An apparatus, comprising:
means for performing a hybrid multiplication of multiple-precision operands in accordance with a configurable tuning parameter that associates partial product accumulation with the apparatus, wherein the tuning parameter corresponds, at least in part, to availability of storage elements of the apparatus, wherein the hybrid multiplication is a hybrid of row-wise and column-wise multiplication; and
a memory comprising storage elements operable to store products generated from the hybrid multiplication means.

38. The apparatus of claim 37 further comprising means for performing security operations with products generated from the hybrid multiplication means.

39. The apparatus of claim 37 further comprising a plurality of storage elements to host partial products generated from performing the hybrid multiplication.

40. The apparatus of claim 39, further comprising means for defining a configurable tuning parameter that scales the hybrid multiplication to the number of storage elements available in the apparatus for the hybrid multiplication.

41. A machine-readable storage medium or memory storing:
- a first sequence of instructions usable to program a computer system to perform hybrid multiplication of multiple-precision operands in accordance with a configurable tuning parameter that associates partial product accumulation with a target platform, wherein the tuning parameter corresponds, at least in part, to availability of storage elements on the target platform,
- wherein the hybrid multiplication is a hybrid of row-wise multiplication and column-wise multiplication.

42. The machine-readable storage medium or memory of claim 41, wherein performing hybrid multiplication includes the first sequence of instructions executable to select control values from a state machine.

43. The machine-readable storage medium or memory of claim 42, storing a second sequence of instructions usable to program the computer system to adjust the control values of the state machine in accordance with the configurable tuning parameter.

44. The machine-readable storage medium or memory of claim 43, wherein the tuning parameter defines width of partial rows, wherein the partial rows are the number of words of a multiple-precision multiplicand operand for a partial product.

* * * * *

UNITED STATES PATENT AND TRADEMARK OFFICE
CERTIFICATE OF CORRECTION

PATENT NO. : 7,650,374 B1
APPLICATION NO. : 10/996103
DATED : January 19, 2010
INVENTOR(S) : Gura et al.

It is certified that error appears in the above-identified patent and that said Letters Patent is hereby corrected as shown below:

Claim 9, col. 14, lines 51 and 52, please delete "$(d)=\max\{i|1\leq i\leq n, r\geq 3i+1+|\log_2(n/i)/k|\}$" and insert --$(d)=\max\{i|1\leq i\leq n, r\geq 3i+1+|\log_2(n/i)/k|\}$-- after "parameter".

Claim 21, col. 15, line 29, please delete "$(d)=\max\{i|1\leq i\leq n, r\geq 3i+1+|\log_2(n/i)/k|\}$" and insert --$(d)=\max\{i|1\leq i\leq n, r\geq 3i+1+|\log_2(n/i)/k|\}$-- after "parameter".

Signed and Sealed this

Sixth Day of April, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,650,374 B1 | Page 1 of 1 |
| APPLICATION NO. | : 10/996103 | |
| DATED | : January 19, 2010 | |
| INVENTOR(S) | : Gura et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1051 days.

Signed and Sealed this

Twenty-third Day of November, 2010

David J. Kappos
*Director of the United States Patent and Trademark Office*